ǫ  4,693,549

United States Patent [19]
Cheo

[11] Patent Number: 4,693,549
[45] Date of Patent: Sep. 15, 1987

[54] OPTICALLY BUFFERED WAVEGUIDE MODULATOR

[75] Inventor: Peter K. Cheo, West Hartford, Conn.

[73] Assignee: United Technologies Corporation, Hartford, Conn.

[21] Appl. No.: 720,196

[22] Filed: Apr. 4, 1985

[51] Int. Cl.[4] .......................... G02B 6/14; G02F 1/00
[52] U.S. Cl. .................... 350/96.14; 350/96.12; 350/96.15
[58] Field of Search .................... 350/96.11–96.15

[56] References Cited

U.S. PATENT DOCUMENTS

| | | | |
|---|---|---|---|
| 4,124,270 | 11/1978 | Cheo | 350/96.12 |
| 4,169,009 | 9/1979 | Wagner et al. | 156/636 |
| 4,208,091 | 6/1980 | Cheo et al. | 350/96.13 |

FOREIGN PATENT DOCUMENTS 0165122 12/1981 Japan ................. 350/96.13

OTHER PUBLICATIONS

Wright, S., "Optical Waveguide Polariser with Synchronous Absorption", Electronics Letters, vol. 15, No. 17, Aug. 1979, pp. 510–512.
P. K. Cheo, *Frequency Synthesized and Continuously Tunable IR Laser Source in 9–11 $\mu$m*, IEEE Journal of Quantum Electronics, vol. QE-20, No. 7, Jul. 1984.
P. K. Cheo et al., *Infrared Electrooptic Waveguides*, IEEE Journal of Quantum Electronics, vol. QE-13, No. 4, Apr. 1977.
P. K. Cheo et al., *Continuous Tuning of 12 GHz in Two Bands of $CO_2$ Laser Lines*, Optics Letters, vol. 1, No. 1, Jul. 1977.
P. K. Cheo, *Generation and Applications of 16 GHz Tunable Sidebands from a $CO_2$ Laser*, Laser Spectroscopy III, Edition by J. L. Hall and J. L. Carlsten, Springer Verlag, Berlin Heidelberg, New York, pp. 394–401, 1977.
P. K. Cheo, et al., *Continuous Tuning of 12 GHz in Two Bands of $CO_2$ Laser Lines*, Optics Letters, vol. 1, No. 1, Jul. 1977.

Primary Examiner—John Lee
Attorney, Agent, or Firm—Eric W. Petraske

[57] ABSTRACT

An electro-optic infrared modulator is provided that it contains an optically buffered waveguide. The buffer comprises a dielectric layer on the top and bottom surface of the waveguide which provides enhanced optical isolation and enables improved synchronization between the microwave and optical waves traveling in the waveguide.

12 Claims, 3 Drawing Figures

OPTICALLY BUFFERED WAVEGUIDE MODULATOR

DESCRIPTION

1. Technical Field

This invention relates to electro-optic devices and more particularly to infrared electro-optic waveguide modulators having multiple layers.

2. Background Art

Optical waveguides fabricated from electro-optic crystals that provide modulation of a propagating laser signal are well known in the art. These devices rely on the electro-optic properties of selected crystalline materials to produce a variation in the crystal's refractive index in response to a standing or traveling microwave field inside the guiding crystal. The periodic change in the index of refraction produces phase shift modulation of the propagating infrared laser beam. Phase shift modulation creates a power conversion of a portion of the infrared carrier signal into optical sideband signals. The modulated infrared beam comprises an input carrier frequency and upper and lower sideband frequencies. Each sideband occurs within a modulation bandwidth defined as the frequency range of the optical sideband signals between the minus 3db or half power points.

Broadband modulation requires efficient coupling of microwave and optical fields into the waveguide. In addition, efficient interaction between these waves mandates proper synchronization of the traveling optical and microwaves, such that each wave front possesses nearly the same phase velocity.

The planar waveguide modulators of the prior art include both standing wave and traveling wave ridge modulators as reported in an article entitled "Microwave Modulation of $CO_2$ Lasers in GaAs Optical Waveguides" by P. K. Cheo and M. Gilden, Applied Physics Letters, Volume 25, Number 5, Sept. 1, 1974, Pages 272 to 274 and "Thin Film Waveguide Devices" by P. K. Cheo, Applied Physics, Volume 6, Pages 1–19, 1975.

The performance of these devices is inhibited by the lack of intimate electrical contact between the electrode surface and the surface of the waveguide. Variable air gaps between these surfaces resulting from imperfect fabrication degrade the broadband impedance match between the input impedance of the microwave ridge waveguide and the output impedance of the microwave source. Moreover, the air gap causes an increase in the velocity propagation of the microwave signal in the interaction region. The air gap on the waveguide creates a composite medium with an index of refraction less than that of the waveguide itself, causing increased non-synchronization between the modulating signal and the optical wave, and yielding a reduction in modulator performance.

Other modulators have been developed that integrate the electrodes with the waveguide itself. These devices have microwave electrodes formed directly on the top and bottom surfaces of a thin film optical waveguide. Modulators of this group include those which comprise a non-coplanar thin film optical waveguide. These newer modulators comprise a guided laser propagation path fabricated with a ridge raised from a planar surface of the device and having a metalized electrode formed thereon. In some embodiments these devices additionally contain a dielectric pedestal, typically comprised of gallium arsenide, that is raised from the planar surface on the ridge region.

Although providing for greater conversion efficiency, these devices have several drawbacks. Modulators having an integrated electrode structure suffer from high optical power losses from absorption by the metal electrodes. This factor becomes quite significant as the thickness of the waveguide decreases and becomes comparable to the laser signal wavelength. In addition, phase velocity synchronization in the integrated modulators described hereinabove is achieved by adjusting the ratio of transformer widths of the microwave electrode. Precise synchronization between the microwave and optical signal is often not possible because of the difficulties encountered in fabrication and in compensating the electrode design for the power handling capacities of the structure. These problems result in optical distortion in the modulated wave and less than fully realizable conversion efficiency.

DISCLOSURE OF THE INVENTION

An object of the present invention is to provide an infrared electro-optic waveguide having an optical buffer. Another object of the present invention is to provide a broadband infrared electro-optic modulator having an optically buffered waveguide.

According to the present invention, a waveguide comprises a dielectric wafer having an index of refraction and having first and second surfaces. The waveguide also includes an optical buffer whose index of refraction is less than the waveguide's index of refraction. The optical buffer is deposited on the wafer's first and second surfaces.

According to another aspect of the present invention an infrared electro-optic modulator includes an optically buffered waveguide comprising a dielectric wafer that has an index of refraction and first and second surfaces with the first surface having a ridge formed thereon providing for guided mode propagation of the laser signal. The waveguide also comprises an optical buffer that is deposited on the waveguide ridge and is deposited on the second waveguide surface. The electro-optic modulator additionally comprises a metal electrode that is disposed on the second surface buffer forming a ground plane and is disposed on the first waveguide surface including a microstrip electrode disposed on said ridge buffer for receiving and transmitting the microwave signal. The waveguide also comprises a metal base adapted for bonding the ground plane thereto.

BEST MODE FOR CARRYING OUT THE INVENTION

Figure 1:
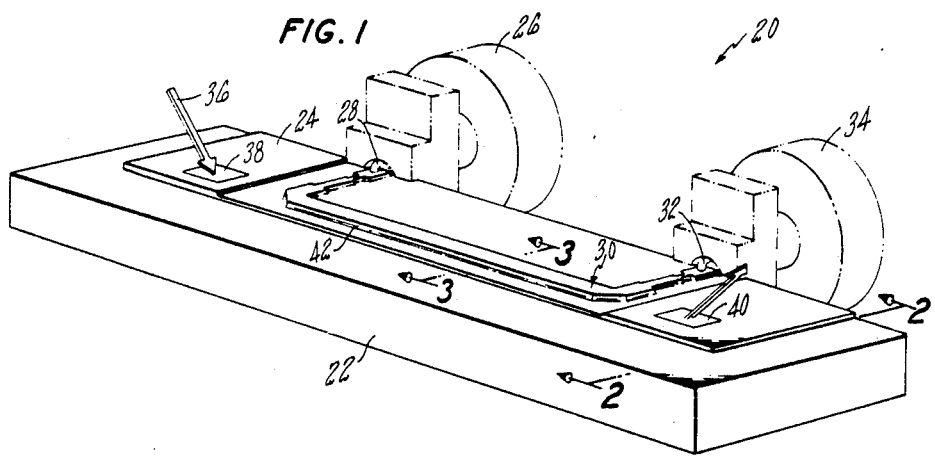
FIG. 1 is a prospective illustration of an infrared electro-optic modulator having an optical buffer provided according to the present invention.

Referring first to FIG. 1, an optically buffered waveguide modulator provided according to the present invention comprises an optically buffered waveguide modulator 20 and includes metal base 22 and buffered waveguide 24. The dimensions of the various components shown in FIG. 1 have been exaggerated for illustrative purposes.

A conventional microwave signal generator which is external to the modulator and not part of the present invention provides microwave signals to microwave terminal 26. In the best mode embodiment, the signal generator comprises a frequency synthesizer with a high power broadband traveling wave tube amplifier operating in the Ku and X bands. Modified microstrip launcher 28 launches the microwave energy along microstrip network 30. The launcher has a flat planar interface with the network providing intimate contact between the microwave terminal and the electrode.

In response to the microwave energy, an electric field is established within the waveguide structure itself. The most intense electric field is induced in that portion of the waveguide located underneath the network electrode. The microwave induced electric field results in a periodic change of the index refraction of the waveguide material. Through launcher 32, microwave terminal 34 provides a return to an appropriate signal termination for the microwave signals. Since the microwave launchers are of a broadband design and correctly terminated, only a forward traveling wave will exist in the modulator. Those skilled in the art will note that the direction of propagation the microwave and optical signals must be the same. Reversing the direction of propagation of the optical signal mandates a reversal of the microwave signal source and microwave return terminals.

A coherent infrared source that is not shown and not part of the present invention provides optical signal 36 which is a $CO_2$ laser in the best mode embodiment. The signal is coupled into and subsequently out of the modulator by the use of coupling prisms (not shown) that are located on optical regions 38 and 40. The preferred prism couplers may be right angle germanium prisms of a type known in art having prism geometry selected to provide excitation of the lower order $TE_0$ and $TE_1$ optical propagation modes within the guide. The thickness and geometry of the waveguide is chosen such that the laser beam is limited to guided mode propagation in the waveguide.

The periodically changing index refraction of the waveguide material provided by the applied microwave signal generates phase shift modulation of the laser beam traversing through the waveguide. Phase shift modulation of a propagating $CO_2$ laser beam and microwave frequencies generates both upper and lower sideband frequencies which can be subsequently resolved from the laser signal. Tuning of the sideband frequency of the optical signal over a finite range is possible by varying the microwave signal frequency.

Efficient broadband modulation of the optical carrier requires both optimized synchronization between the traveling microwave and traveling optical wavefronts and lateral confinement of the optical signal to the region of the waveguide where the microwave electric field is most intense. The microstrip structure of network electrode 30 is most effective as it can be fabricated using photolithographic techniques well known in the art. As detailed hereinafter in FIG. 2, the optical losses introduced by the network electrode can be reduced by fabricating the waveguide with an optical buffer. In addition, the optical buffer layer allows for optimized synchronization between the traveling microwave and optical wavefronts.

The network electrode is located on a ridge (42, FIG. 2) that is on the top surface of the waveguide. The ridge is fabricated by techniques well known in the art, including standard photolithographic and lift off procedures. In the best mode embodiment the ridge is formed by removing several microns of waveguide material adjacent to the network electrode. The difference in index of refraction presented by the air surrounding the ridge is sufficient to laterally confine the laser signal to that portion of the waveguide which is in registration with microstrip electrode 43 of the network electrode.

Figure 2:
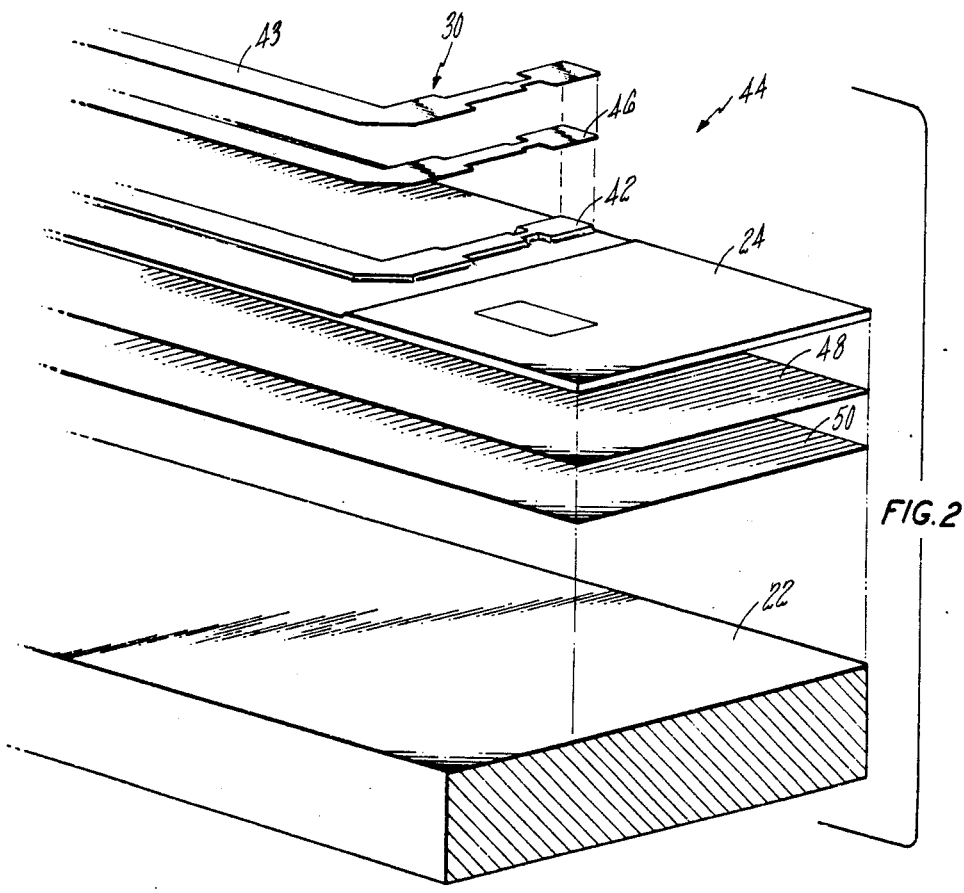
FIG. 2 is an exploded, sectioned illustration of a portion of the modulator of FIG. 1.

FIG. 2 is an illustration partially in section and partially in perspective of an end section 44 of the optically buffered waveguide modulator of FIG. 1. The modulator includes metal base 22 and waveguide 24. The metal base comprises Copper in the best mode embodiment but other materials such as Molybdenum may be substituted.

The material used to fabricate the waveguide may be any infrared electro-optic material that is free from defects. Gallium arsenide (GaAs) and Cadmium telluride (CdTe) the two most commonly used, but equivalent materials may be substituted. In the best mode embodiment the waveguide is fabricated from a large area (3"×3") gallium arsenide wafer. Gallium Arsenide is electro-optically active crystal. Moreover, the depth of modulation in the index of refraction provided by a given applied electric field amplitude varies with different crystallingraphic orientations. In the best mode embodiment the (001) crystallingraphic direction is selected to be perpendicular to the electric field vector. A waveguide fabricated with this orientation displays guided wave modes with low propagation losses and is preferred for chemomechanical polishing performed during fabrication. Those skilled in the art will recognize that other orientations can be substituted.

The waveguide dimensions including the length, width and thickness are selected in dependence on the wavelength of the infrared laser to be phase modulated. The modulator FIG. 1 is described dimensionally in terms of a broadband modulator for a 10.6 micron wavelength $CO_2$ laser. Those skilled in the art will recognize that other infrared lasers operating at different wavelengths may be substituted and that differences in laser wavelengths may result in changes to the values of the waveguide's dimensions.

In the best mode embodiment the length of the waveguide is approximately 5 centimeters and the width is on the order of 1 millimeter. The thickness is approximately 1 or 2 wavelengths of the infrared signal, providing for guided mode propagation. For a 10.6 micron $CO_2$ laser the modulator thickness should be between 10 and 25 microns. The top and bottom major surfaces of the waveguide should be extremely parallel. Consequently the waveguide's final thickness must be uniform to within approximately 1 micron.

Also illustrated in FIG. 2 are upper buffer layer 46 fabricated on ridge 42, and lower buffer layer 48 formed on the waveguide's bottom surface. As hereinafter detailed in FIG. 3, the buffer layers isolate the propagating optical signal from the network electrode and metal beneath the waveguide thereby reducing optical power loss. In addition, the optical buffer layers alter the mirowave characteristics of the modulator and allow for phase synchronization between the traveling microwave and optical wavefronts. In order to provide optical isolation the index of refraction of the buffer layer must be less than that of the gallium arsenide or other material used to fabricate the waveguide. In the best mode embodiment both the upper and lower buffer layers comprise a thin layer of zinc sellenide or thorium fluoride of approximately 1 to 2 microns, although equivalent materials at selected thickness can be used.

Network electrode 30 is formed on top the upper buffer layer to have a geometry that will provide the desired electrical characteristics of the modulator. Fabricated on the lower buffer layer is metal layer 50 which functions as a ground plane and comprises a layer of copper of 5 microns thick in the best mode embodiment. The waveguide is affixed to Copper base 22 by techniques well known in the art. In the best mode embodiment, a 1 to 2 micron thick layer of Epotech 353 ND epoxy is applied to one corner of the guide, allowed to flow underneath the waveguide by capillary action and is subsequently cured.

Figure 3:
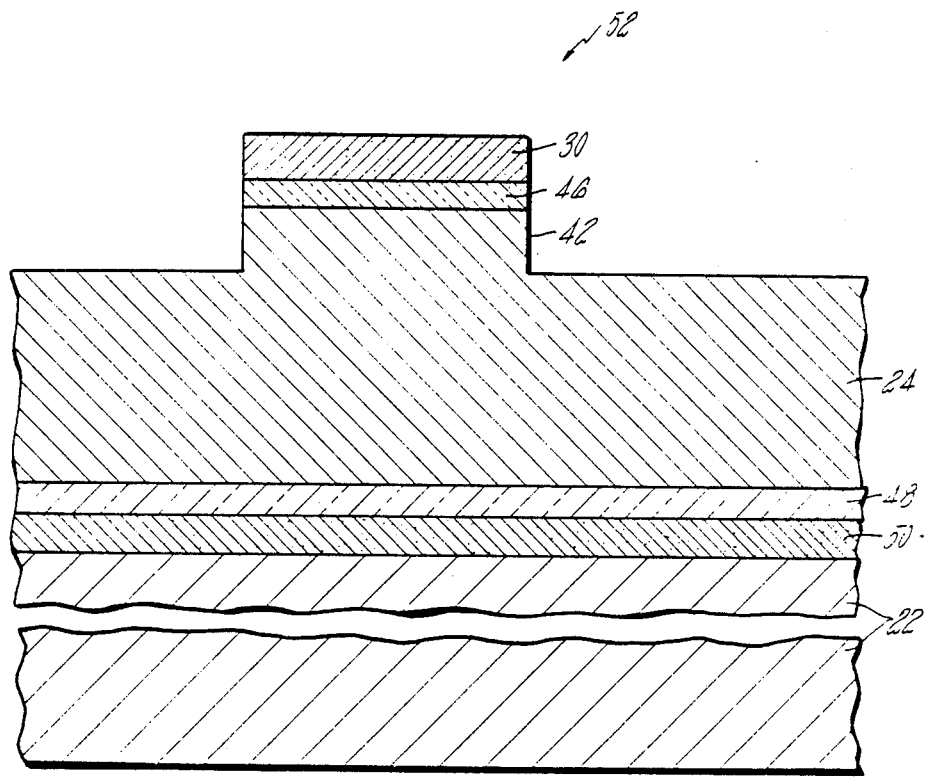
FIG. 3 is a sectioned illustration of a portion of the waveguide of FIG. 1 provided according to the present invention.

FIG. 3 is a Section illustration of a portion 52 of the modulator of FIG. 1. Shown in FIG. 3 is network electrode 30, upper buffer layer 46, ridge 42 and waveguide 24. Also included in FIG. 3 is lower buffer layer 48, metal ground plane 50 and copper base 22. The dimensions shown in FIG. 3 have been exaggerated for purposes of illustration.

In broadband modulators having highly efficient modulation, the optical loss resulting from absorption of the evanescent optical waves by the metallic electrodes cannot be ignored. As is well known in the art, this problem increases in magnitude as the thickness of the device approaches the optical signal wavelength. The optical buffer layers are chosen to be of a material compatible with the waveguide and to have an index of refraction less than that of the optical waveguide. The thickness of the buffer layers should be selected to provide sufficient isolation from the metal electrode and ground planes. Moreover, those skilled in the art will note that the thickness is dependent on the magnitude of the change in refractive index presented by buffer layers of a given material composition and the waveguide material.

In addition to reducing the loss of optical signal power due to absorption of the metal electrodes, the buffer layers change the microwave electrode characteristics of the modulator. Consequently, the parameters of the buffer layers can be selected to match the phase velocities between the traveling optical and microwaves.

The effect of the buffer layers on microwave propagation is estimated from an equivalent circuit model involving a series inductance and shunt capacitance per unit length of an effective transmission line which comprises the network electrode and ground plane as well as the gallium arsenide waveguide isolated therefrom by the optical buffer layers. The width of the network electrode is large compared to the total thickness presented by the buffer layers and waveguide. The thickness of the individual buffer layers is small compared to the overall thickness that includes the waveguide.

The velocity propagation of this transmission line is given by:

$$V = 1/LC.$$

where L is the equivalent inductance which is essentially unchanged by introducing these buffer layers. The effective capacitance of the transmission line can be estimated by using the following expression for the case of a uniform electric field distribution:

$$\frac{1}{C_{eff}} = \frac{1}{A}\left(\frac{t - 2t_b}{\epsilon_1} + \frac{2t_b}{\epsilon_2}\right)$$

where A is the cross sectional area, t constitutes the overall thickness, $t_b$ is the buffer layer thickness, $\epsilon_1$ is the gallium arsenide waveguide dielectric constant and $\epsilon_2$ is the buffer layer dielectric constant. The effective velocity of propagation can be expressed in terms of the velocity in the transmission line without the buffer layers as:

$$v_{eff} = v\sqrt{1 + \frac{2t_b}{t}\left(\frac{\epsilon_1}{\epsilon_2} - 1\right)}$$

For relatively thin buffer layers the relative change in velocity can be approximated by the expression:

$$\frac{v_{eff} - v}{v} = \left(\frac{t_b}{t}\frac{\epsilon_1}{\epsilon_2} - 1\right)$$

In the modulator of FIG. 1 both buffer layers comprise a 2 micron thick layer of zinc sellenide which are deposited on a 16 micron (approximate) gallium arsenide wafer, yielding a 5% increase in microwave phase velocity. The dielectric constant of gallium arsenide at microwave frequencies is 12.3. For an approximate 10 micron guided optical wave the value of gallium arsenide's dielectric constant lies in the range between 10.2 and 10.9.

The microwave propagation velocity is increased at a rate depending on the width of the electrode, thickness of the buffer layer and/or the composition of the waveguide. Therefore a synchronous condition between the guided optical waves and the traveling microwaves can be achieved by proper selection of the buffer layer material and the dimensional parameters thereof. Although shown with only a single upper and lower buffer layer those skilled in the art will recognize that multiple layered buffer layers can be utilized.

Similarly although the invention has been shown and described with respect to a best mode embodiment thereof it should be understood by those skilled in the art that various other changes, omissions and additions thereto may be made therein without departing from the spirit and scope of the invention.

I claim:

1. An infrared electro-optic modulator comprising:
   an optical waveguide slab having substantially parallel top and bottom surfaces, a predetermined waveguide index of refraction in a predetermined optical wavelength range that determines a waveguide phase velocity of light in said wavelength range, a predetermined waveguide dielectric constant, and a predetermined waveguide thickness along an axis perpendicular to said top and bottom surfaces;
   a top optical buffer layer adjacent said top surface, having a buffer index of refraction in said predetermined optical wavelength range that is less than said waveguide index of refraction, a predetermined buffer layer dielectric constant, and a predetermined buffer thickness;
   a top electrode, having a predetermined electrode width along a transverse direction perpendicular to said axis and a predetermined electrode length along a longitudinal direction perpendicular to both said axis and said transverse direction, disposed on said top optical buffer layer; and a bottom electrode disposed below said optical waveguide slab, characterized in that;

a bottom optical buffer layer is formed adjacent said bottom surface and disposed above said bottom electrode, also having said buffer index of refraction, said buffer layer dielectric constant and said buffer thickness; and said waveguide thickness and said buffer thickness of said top and bottom optical buffer layers combine with said top and bottom electrodes to form a microwave transmission line having a predetermined phase velocity for traveling wave microwave signals that is substantially equal to said predetermined waveguide phase velocity of light.

2. The modulator of claim 1 wherein said optical waveguide slab comprises Gallium Arsenide.

3. The modulator of claim 1 wherein said optical waveguide slab comprises Cadmium Telluride.

4. The modulator of claim 1 wherein said top and bottom optical buffer layers comprise Thorium Fluoride.

5. The modulator of claim 1 wherein said top and bottom optical buffer layers comprise Zinc Selenide.

6. An electro-optic modulator according to claim 1, further characterized in that:

said optical waveguide slab has said predetermined waveguide thickness in a waveguide region below said top electrode and a lesser slab thickness outside said waveguide region; and said bottom electrode comPrises a ground plane formed on said bottom optical buffer layer, being in intimate contact with said bottom optical buffer layer, and extending in said transverse direction a predetermined ground plane width substantially greater than said electrode width so that said top and bottom electrodes, said top and bottom optical buffer layers and said optical waveguide slab form a microwave transmission line.

7. The modulator of claim 6 wherein said ground plane comprises Copper.

8. The modulator of claim 6 wherein said ground plane comprises Molybdenum.

9. The modulator of claim 6 wherein said optical waveguide slab comprises Gallium Arsenide.

10. The modulator of claim 6 wherein said optical waveguide slab comprises Cadmium Telluride.

11. The modulator of claim 6 wherein said top and bottom optical buffer layers comprise Thorium Fluoride.

12. The modulator of claim 6 wherein said top and bottom optical buffer layers comprise Zinc Sellenide

* * * * *